(12) United States Patent
Ino et al.

(10) Patent No.: US 8,318,374 B2
(45) Date of Patent: Nov. 27, 2012

(54) FUEL CELL COMPRISING OXYGEN ELECTRODE WITH SURFACE NANOSTRUCTURE

(75) Inventors: Daisuke Ino, Nara (JP); Mitsuru Hashimoto, Kanagawa (JP); Akira Taomoto, Kyoto (JP); Nobuyasu Suzuki, Osaka (JP); Yuka Yamada, Nara (JP)

(73) Assignee: Panasonic Corporation, Osaka (JP)

( * ) Notice: Subject to any disclaimer, the term of this patent is extended or adjusted under 35 U.S.C. 154(b) by 218 days.

(21) Appl. No.: 12/794,381

(22) Filed: Jun. 4, 2010

(65) Prior Publication Data

US 2010/0239951 A1  Sep. 23, 2010

Related U.S. Application Data

(63) Continuation of application No. 12/652,468, filed on Jan. 5, 2010, now abandoned, which is a continuation of application No. PCT/JP2009/001319, filed on Mar. 25, 2009.

(30) Foreign Application Priority Data

Apr. 14, 2008  (JP) .................................. 2008-104424

(51) Int. Cl.
    *H01M 8/10* (2006.01)
(52) U.S. Cl. ...................................................... 429/484
(58) Field of Classification Search .................... 429/484
    See application file for complete search history.

(56) References Cited

U.S. PATENT DOCUMENTS 4,137,372 A  1/1979  Jalan et al.
2004/0121221 A1  6/2004  Suzuki et al.
2006/0180798 A1 *  8/2006  Chida et al. ................... 252/502

FOREIGN PATENT DOCUMENTS

| EP | 1 662 597 A1 | 5/2006 |
| EP | 1662597 A1 * | 5/2006 |
| JP | 54-82394 | 6/1979 |
| JP | 10-241703 | 9/1998 |
| JP | 2003-036860 | 2/2003 |
| JP | 2004-207228 | 7/2004 |
| JP | 2005-087864 | 4/2005 |
| JP | 2005-129369 | 5/2005 |
| JP | 2006-140017 | 6/2006 |

(Continued)

OTHER PUBLICATIONS

Extended Abstracts (The 69th Autumn Meeting, 2008); The Japan Society of Applied Physics, No. 2, p. 574 (together w/ partial English translation thereof).

(Continued)

*Primary Examiner* — Karie O'Neill Apicella
(74) *Attorney, Agent, or Firm* — McDermott Will & Emery LLP

(57) ABSTRACT

An oxygen electrode used in the fuel cell and includes a plurality of carbon particles, a carbon thin-film, and surface nanostructure. The carbon particles are bonded to one another with the carbon thin-film, and the surface nanostructure is formed on the surface of the carbon thin-film. The surface nanostructure comprises catalyst nanoparticles made of platinum (Pt) and carbon nanoparticles. According to this combination of these elements, the catalyst nanoparticles are confined within three-dimensional structure to be formed by the carbon nanoparticles and are immobilized without losing space which allows any reactant to be accessed to the surface of the catalyst nanoparticles.

2 Claims, 9 Drawing Sheets

FOREIGN PATENT DOCUMENTS

| | | |
|---|---|---|
| JP | 2006-156366 | 6/2006 |
| JP | 2006140017 A * | 6/2006 |
| JP | 2006-281155 | 10/2006 |
| JP | 2007-024270 | 2/2007 |
| JP | 2007-200804 | 8/2007 |

OTHER PUBLICATIONS

The 49th Battery Symposium in Japan, p. 55, Nov. 5-7, 2008.

The Electrochemical Society Prime 2008 Meeting, Abstract #841.

* cited by examiner

FUEL CELL COMPRISING OXYGEN ELECTRODE WITH SURFACE NANOSTRUCTURE

RELATED APPLICATIONS

This application is a Continuation of U.S. application Ser. No. 12/652,468, filed on Jan. 5, 2010, now abandoned, which is a continuation application under U.S.C. 111(a) of pending prior International application No. PCT/JP2009/001319, filed on Mar. 25, 2009, which in turn claims the benefit of Japanese Application No. 2008-104424 filed on Apr. 14, 2008, the disclosures of which application are incorporated by reference herein.

TECHNICAL FIELD

The present invention relates to a fuel cell characterized in surface structure of an oxygen electrode thereof.

BACKGROUND ART

Power generation performance of fuel cell is strongly depended on net surface area of catalyst contained in a catalytic electrode. When the surface area is increased, the current density at electrical generation is increased to improve the output voltage. Downsizing of catalyst in the form of several nanometer particles is an effective method to increase the surface area of the catalyst per unit mass. Thus, nanoparticles of metal or alloy with a diameter of about 5 nm have usually been used as catalyst nanoparticles.

On the other hand, there was a problem of reducing the total surface area of the catalyst due to mutual aggregation of the catalyst nanoparticles during electrical generation by fuel cell. In order to suppress such aggregation by dispersing the catalyst nanoparticles into the catalytic electrode, the catalytic electrode with large surface area, comprising acetylene black with a diameter of 30-100 nm as a main constitutive element, has generally been used. Since the catalyst nanoparticles were produced on the acetylene black according to reduction-precipitation method or the like, they were physically adsorbed on the catalytic electrode surface. However, due to a week interaction between the catalytic electrode surface and the catalyst nanoparticles, this method is not capable of preventing the aggregation of smaller catalyst nanoparticles especially with a diameter of 1-3 nm. Large surface area of the catalyst nanoparticles fails to be kept during electrical generation. Excellent power generation performance which appeared at the earlier stage therefore rapidly disappears.

In order to solve this problem, proposed were a method for immobilizing platinum nanoparticles by degrading carbon monoxide or hydrocarbons at the surface of the platinum nanoparticles which serve as catalyst nanoparticles and adsorbing carbon to the site adjacent thereto (Patent Publication 1) and a method for implanting platinum into the carbon nanoparticles by simultaneously evaporating carbon and platinum with arc discharge (Patent Publication 2). Also there was a method for introducing chemical bonding force based on molecular cross-linked structure or the like at an interface between the catalyst nanoparticles and the carbon nanoparticles such as acetylene black and immobilizing those (Patent Publication 3).

Patent Publication 1: Japanese Patent Laid-Open Publication No. Sho 54-82394
Patent Publication 2: Japanese Patent Laid-Open Publication No. 2006-140017
Patent Publication 3: Japanese Patent Laid-Open Publication No. 2004-207228
Patent Publication 4: Japanese Patent Laid-Open Publication No. 2005-087864
Patent Publication 5: Japanese Patent Laid-Open Publication No. 2005-129369
Patent Publication 6: Japanese Patent Laid-Open Publication No. 2006-156366

SUMMARY OF THE INVENTION

According to the foregoing conventional methodologies, since the platinum nanoparticles were completely embedded below carbon overlayers at the earlier stage, any reactive element (oxygen, hydrogen) is not capable of being accessed to the surface thereof to lose any catalytic function. In order to reactivate platinum surface without losing any immobilizing function by carbon overlayers, it is necessary to remove such carbons in angstrom accuracy, however, this needs very precise operation. According to a method of removing carbons with oxidation, carbons exposed at the surface will be removed at substantially uniform reaction rate. On the other hand, under the nanometer scale, adsorption level and vapor deposition level on carbons for the platinum nanoparticles are inhomogeneous locally. Thus, it is substantially impossible to apply similar immobilizing treatment to the numerous platinum nanoparticles, any desired immobilizing effect would not be realized thereby.

When chemical bonding force based on molecular cross-linked structure was employed to immobilize the catalyst nanoparticles, there are problems both of significantly changing the surface property of the catalyst nanoparticles with chemical bonding and of significantly reducing the surface area with catalytic activity.

The present invention is to solve the foregoing problems known in the prior arts and is aimed to provide a fuel cell with an oxygen electrode which realizes both catalytic function and immobilization of the catalyst nanoparticles simultaneously even if they are very small nanoparticles.

The present invention is directed to a fuel cell comprising an oxygen electrode, a hydrogen electrode and solid polyelectrolyte,
wherein the solid polyelectrolyte is sandwiched between the oxygen electrode and the hydrogen electrode,
the oxygen electrode is a layered electrode comprising
  (a) a plurality of carbon particles 1,
  (b) a carbon thin-film 2, and
  (c) surface nanostructure 3, wherein
  (d) the carbon particles 1 are bonded to one another by the carbon thin-film 2,
  (e) the surface nanostructure 3 is formed on surface of the carbon thin-film 2,
  (f) the surface nanostructure 3 comprises catalyst nanoparticles 4 made of platinum and carbon nanoparticles 5,
  (g) diameter of each of the carbon particles 1 is 30 nm or more and 100 nm or less,
  (h) diameter of the catalyst nanoparticle 4 is 1.7 nm or more and 3.1 nm or less, and
  (i) diameter of the carbon nanoparticle 5 is 1.0 nm or more and 11.2 nm or less.

According to the present invention with regard to the oxygen electrode, since the catalyst nanoparticles are arranged at vacancy and recess formed with the carbon nanoparticles in the three-dimensional surface nanostructure, the catalyst nanoparticles is capable of receiving reactant molecules and offer their catalytic activities. In addition, the catalyst nanoparticles are located into surface and inner of the three-dimensional structure formed with the carbon nanoparticles and are immobilized thereby.

Furthermore, by immobilizing the catalyst nanoparticles in the form of contacting with a plurality of carbon nanoparticles, the catalyst nanoparticles will not be allowed to pass any opening among carbon nanoparticles, and aggregation thereof can duly be suppressed.

According to the fuel cell of the present invention, improved and stable power generation performance will be realized without reducing reactive area in the catalyst.

These and other objects, additional aspects and advantages of the present invention will become apparent from the following detailed description on the preferred embodiments by referring to the drawings attached hereto.

According to the fuel cell of the present invention, by using therein the oxygen electrode with the surface nanostructure, the catalyst nanoparticles with a diameter of about 1-3 nm fail to aggregate substantially when they contact with adjacent nanoparticles. Since it is not necessary to cover surface of the catalyst nanoparticles with molecules or carbon overlayers, reactant molecules are capable of reaching the surface of the catalyst nanoparticles and their catalytic activities are also not be inhibited. Therefore, it comes to be possible to realize both catalytic function and immobilization of the catalyst nanoparticles on the surface of the catalytic electrode.

DETAILED DESCRIPTION OF THE PREFERRED EMBODIMENTS

Embodiments of the present invention are described as follows with reference to the drawings attached hereto.

Embodiments

Figure 1:
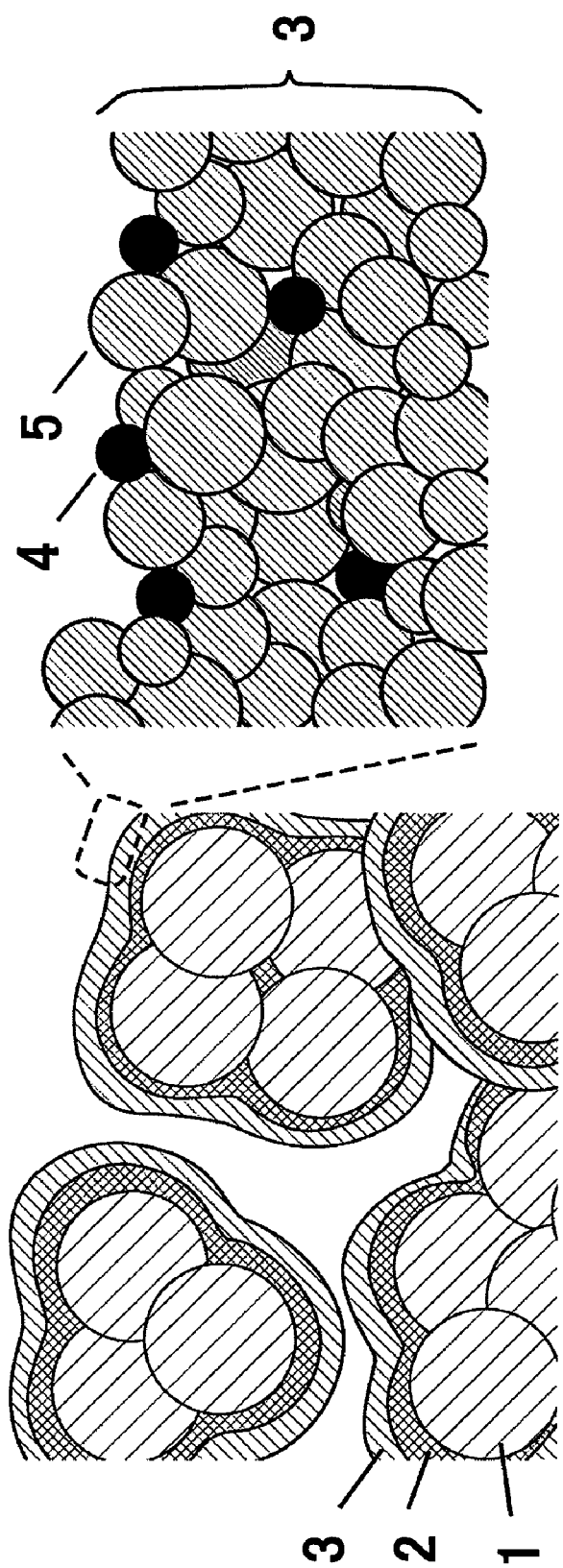
FIG. 1 is a cross-sectional view of the oxygen electrode with surface nanostructure according to Embodiment 1.

FIG. 1 is a cross-sectional view of the oxygen electrode (a catalytic electrode) with surface nanostructure according to Embodiment 1. In FIG. 1, 1 indicates the carbon particles of conductive powder, 2 indicates the carbon thin-film of conductive thin-film, and 3 indicates the surface nanostructure. Carbon particles 1 are bonded to one another with the carbon thin-film 2, and the surface nanostructure 3 is formed on the surface of the carbon thin-film 2. Such constitutive elements increase the surface nanostructure 3 per unit volume of the oxygen electrode.

Surface nanostructure 3 formed on the carbon thin-film 2 further comprises the catalyst nanoparticles 4 and the carbon nanoparticles 5. Right column of FIG. 1 is the enlarged view of the outermost of the surface nanostructure 3. Quasi-spherical carbon nanoparticles 5 form three-dimensional structure where the catalyst nanoparticles 4 are confined at vacancies and recess. This surface structure has pathways to surface of catalyst nanoparticles which reactant molecules pass through, even though catalyst nanoparticles are located in subsurface vacancy. In addition, the catalyst nanoparticles 4 are preventing from passing through opening among the carbon nanoparticles 5 and are duly immobilized.

Surface nanostructure 3 is capable of offering their function when at least two or three carbon nanoparticles are stacked along with the depth direction. Thus, any kind and shape of a substrate for forming the surface nanostructure 3 can be used if they are available for fuel cell. For example, acetylene black with a diameter of 30 nm or more and 100 nm or less is available as the carbon particles 1 as noted in the column of BACKGROUND ART. Then, the carbon thin-film produced by heat-treating polymer containing carbon is available as the carbon thin-film 2.

Figure 2:
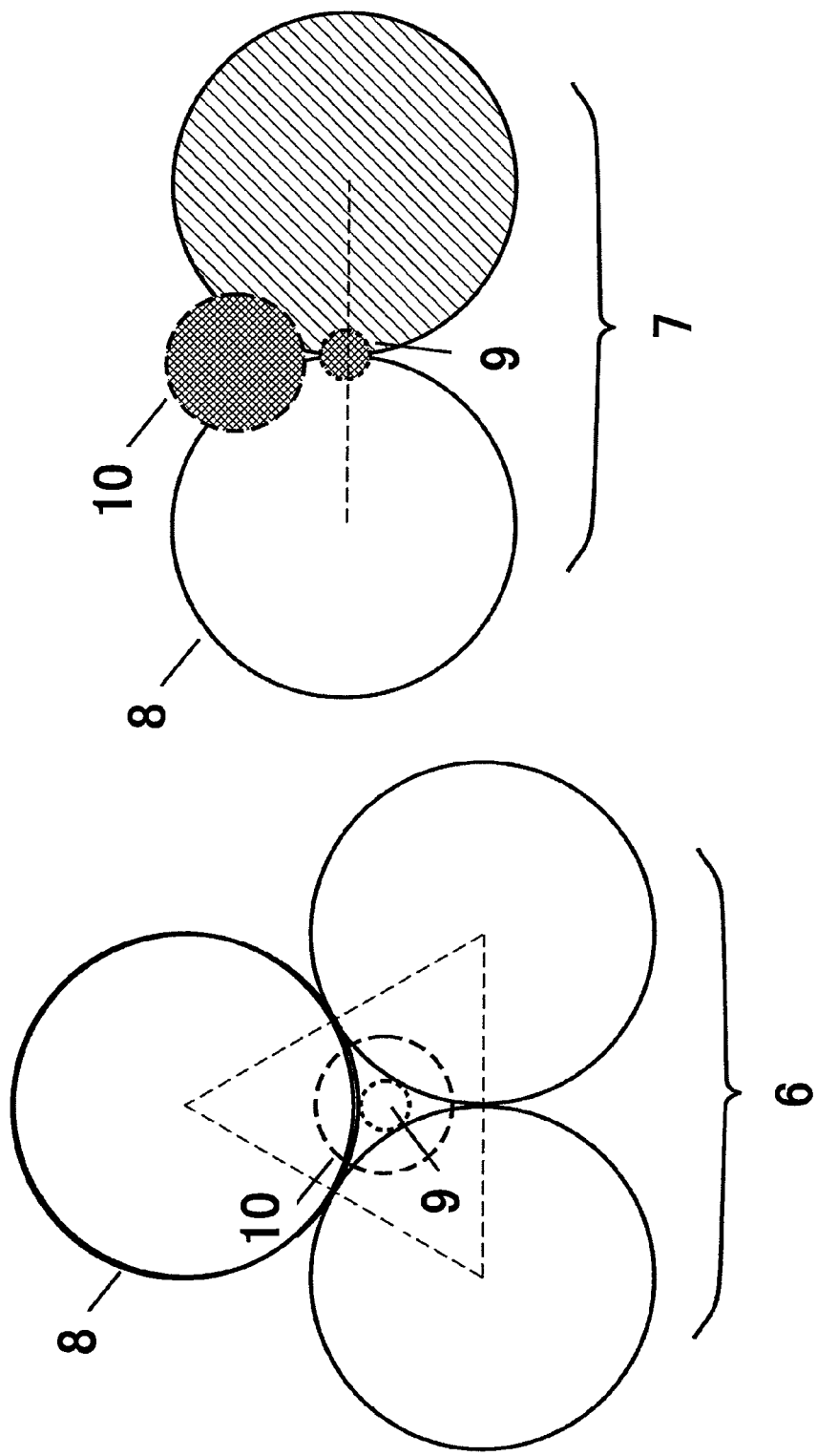
FIG. 2 is a view illustrating relation between size of carbon nanoparticles and that of catalyst nanoparticles according to Embodiment 1.

The relation between the size of the catalyst nanoparticles and that of the carbon nanoparticles is described. In FIG. 2, the denotation 6 is a plan view showing the relation between the size of the carbon nanoparticles and that of the catalyst nanoparticles. The denotation 7 is a cross-sectional view of the plan view 6. In FIG. 2, 8 indicates a carbon nanoparticle, and the opening made by aligning and closest packing three carbon nanoparticles 8 is indicated therein as the denotation 9. In order to immobilize the catalyst nanoparticles in a space made by the carbon nanoparticles 8, it is necessary that the diameter of the catalyst nanoparticles is at least larger than the opening 9. Namely, with regard to the size of the catalyst nanoparticles 10 (diameter a nm) to that of the carbon nanoparticles 8 (diameter b nm), it is necessary that b is less than $\sqrt{3}/(2-\sqrt{3})a$ in order to realize the minimum size which allows immobilization of them with the opening 9.

On the other hand, the minimum size of the carbon nanoparticles is preferably 1 nm or more in order to pass the reactant molecules (gaseous molecules such as hydrogen or oxygen) through the opening 9. Diameter b in the carbon nanoparticles should therefore meet the equation of $1 \leq b \leq \sqrt{3}/(2-\sqrt{3})a$.

REFERENCE EXAMPLE

Preparation of Surface Nanostructure

Platinum (Pt) nanoparticles with a diameter of 1.7-3.1 nm were prepared as the catalyst nanoparticles 4, and the surface nanostructure 3 was produced on the 12 mm square of Highly Oriented Pyrolytic graphite (NT-MDT, Russia).

The catalyst precursor solution containing platinum was prepared by mixing 0.95 g of chloroplatinic acid (IV) •hexahydrate (Wako Pure Chemical Industries, Ltd.), 7.85 g of polyamic acid solution and 17.5 g of dimethylacetamide (Wako Pure Chemical Industries, Ltd.; Guaranteed Reagent). Polyamic acid was prepared by synthesizing 4,4'-diaminodiphenylether (Tokyo Chemical Industry Co., Ltd.) and pyromellitic acid anhydride (Tokyo Chemical Industry Co., Ltd.). Synthesis was performed by mixing 5.00 g of 4,4'- diaminodiphenylether and 120 g of dimethylacetamide, then dissolving those, adding thereto 5.45 g of pyromellitic acid anhydride, and agitating them for about three hours.

In the Reference Example, the catalyst precursor solution was diluted four-fold with dimethylacetamide, then it was dropped on the freshly cleaved graphite. Excess solution on the graphite was removed with spin coating method (5,000 rpm revolution, 150 seconds), and the solvent was evaporated in the low-vacuum chamber. Then the graphite base was heated with the low-vacuum dryer. Temperature was elevated from the room temperature to 200° C. in 40 minutes and the elevated temperature was kept for two hours. Finally, this graphite was transferred to an infrared imaging furnace under the argon atmosphere and was heated for 30 minutes at arrival temperature of 800° C. which was elevated in the range of 1-20° C. per second. As a result of these procedures, the surface nanostructure 3 consisting of both the carbon nanoparticles and the platinum nanoparticles is prepared.

Figure 3:
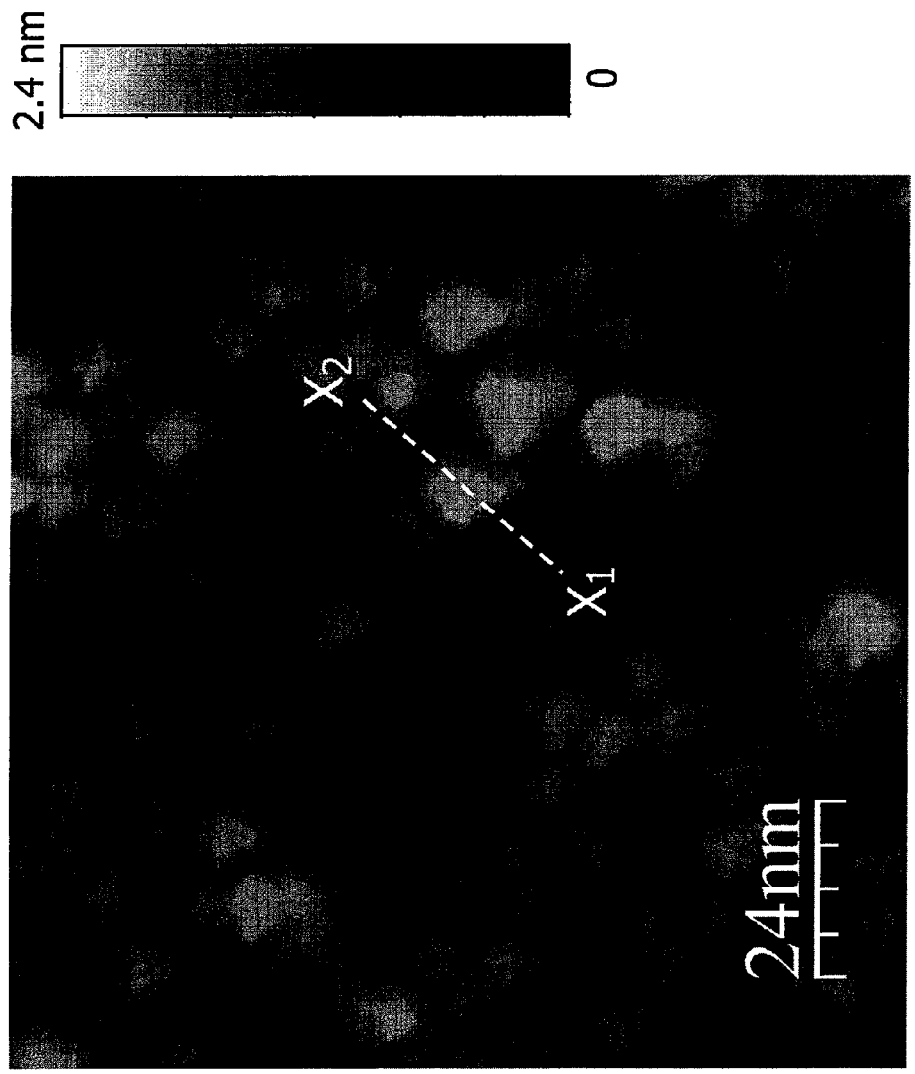
FIG. 3 is a picture taken with scanning tunneling microscope (STM) for surface nanostructure according to Reference Example.
Figure 4:
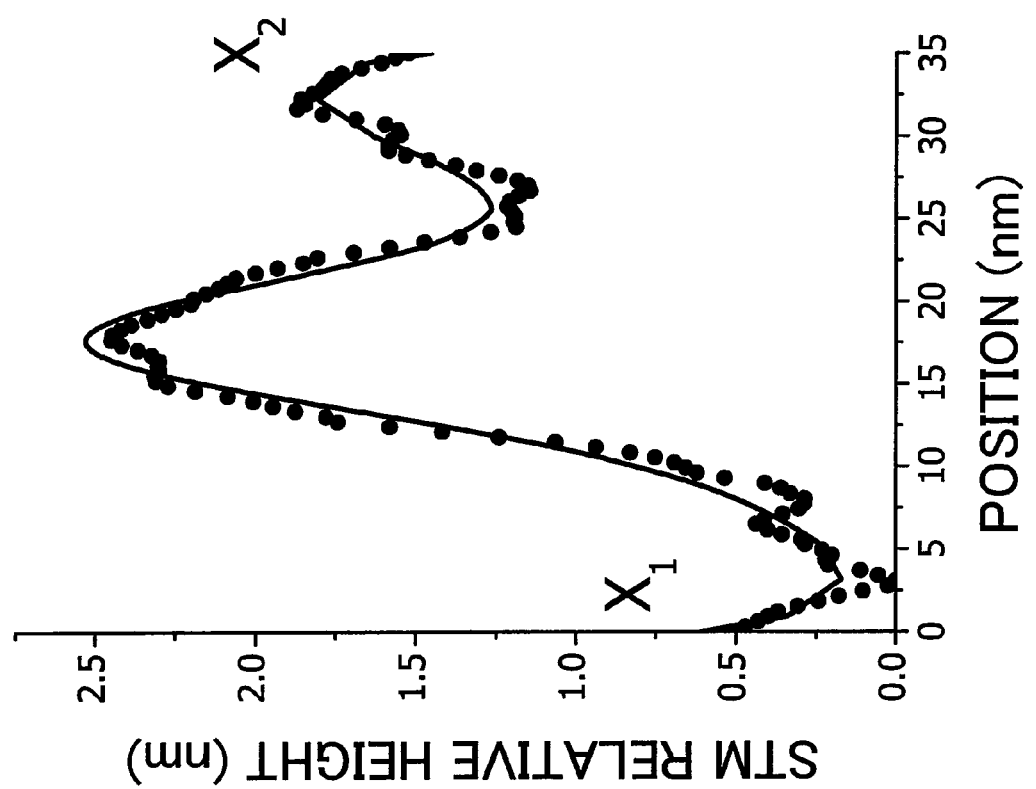
FIG. 4 is a graph illustrating STM height profile on carbon nanoparticles according to Reference Example.

FIG. 3 shows the surface nanostructure taken by scanning tunneling microscope (STM). The observation was performed under the air atmosphere, and bias voltage for the sample was 0.3 V and tunnel current was 0.3 nA. The surface was covered with particulate substances. Ratio of the elements contained in this surface was 0.0006 atom of platinum to one atom of carbon. Thus, almost all of the observed particles were carbon nanoparticles. Twenty carbon nanoparticles were randomly sampled from FIG. 3 and the diameter of the carbon nanoparticles were determined with height profile of STM. FIG. 4 shows a cross section height profile taken from $X_1$-$X_2$ line in FIG. 3. When a peak was fitted by using Gaussian function and full width at half maximum was regarded as the diameter of the carbon nanoparticles, the average value was determined to be 6.1 nm. Then, when distribution of the diameter was regarded as normal distribution and confidence interval was 0.997, $3\sigma=5.1$ nm was obtained. Therefore, 99.7% of the carbon nanoparticles shown in FIG. 3 each have a diameter of 1.0 nm or more and 11.2 nm or less.

Figure 5:
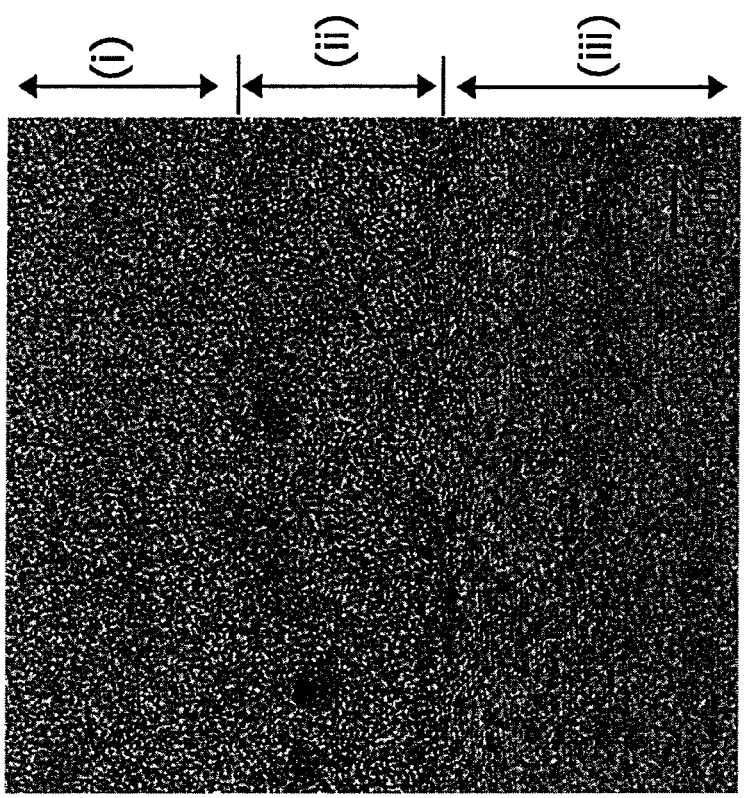
FIG. 5 is an picture taken with cross-sectional transmission electron microscope (TEM) on surface nanostructure according to Reference Example.

FIG. 5 shows the result of observation on cross-section of the surface nanostructure with transmission electron microscope (TEM) to determine the diameter of the platinum nanoparticles contained in the surface nanostructure. In order to observe the cross-section, a carbon vapor-deposited film was formed on the outermost of the surface nanostructure. Three area (i), (ii) and (iii) were identified in this picture, namely, they were (i) the carbon deposited film for TEM observations, (ii) the surface nanostructure and (iii) graphite substrate, respectively. Thickness of the surface nanostructure was about 20 nm. In the area (ii), there were dark spots in size of about several nm, and they were identified as platinum by using electron diffraction. One thousand platinum nanoparticles were sampled in the optional sites, then the average diameter thereof was determined as 2.4 nm and $3\sigma=0.7$ nm was obtained. Therefore, 99.7% of the carbon nanoparticles may each have a diameter of 1.7 nm or more and 3.1 nm or less.

Figure 6:
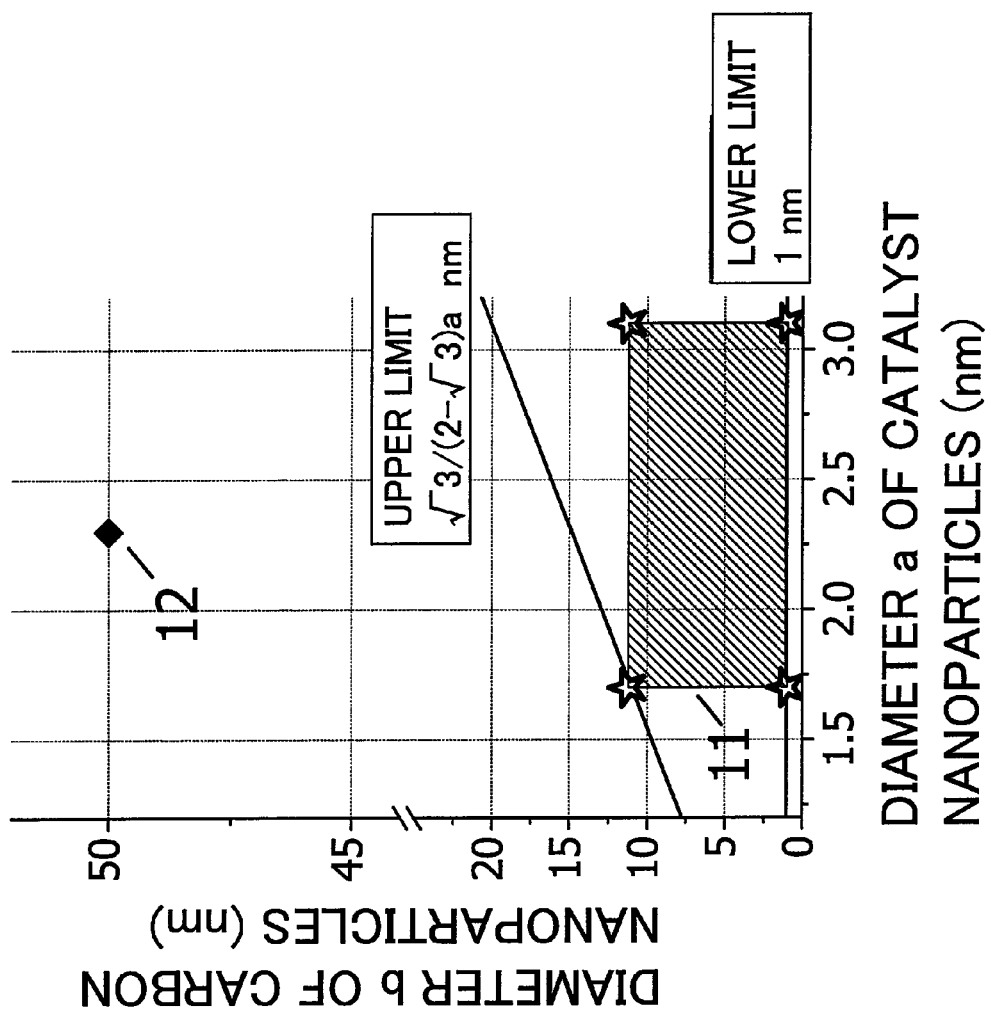
FIG. 6 is a view illustrating plots on upper limit and lower limit of carbon nanoparticles with respect to catalyst nanoparticles according to Embodiment 1.

FIG. 6 shows the relation between the diameter of the carbon nanoparticles and that of the platinum nanoparticles according to Embodiment 1. In FIG. 6, the hatched area denoted as 11 is the diameter range of the carbon nanoparticles and of the platinum nanoparticles determined respectively in Reference Example. The hatched area is fallen within the diameter range of $1 \leq b \leq \sqrt{3}/(2-\sqrt{3})a$ for realizing the surface nanostructure 3.

Figure 7:
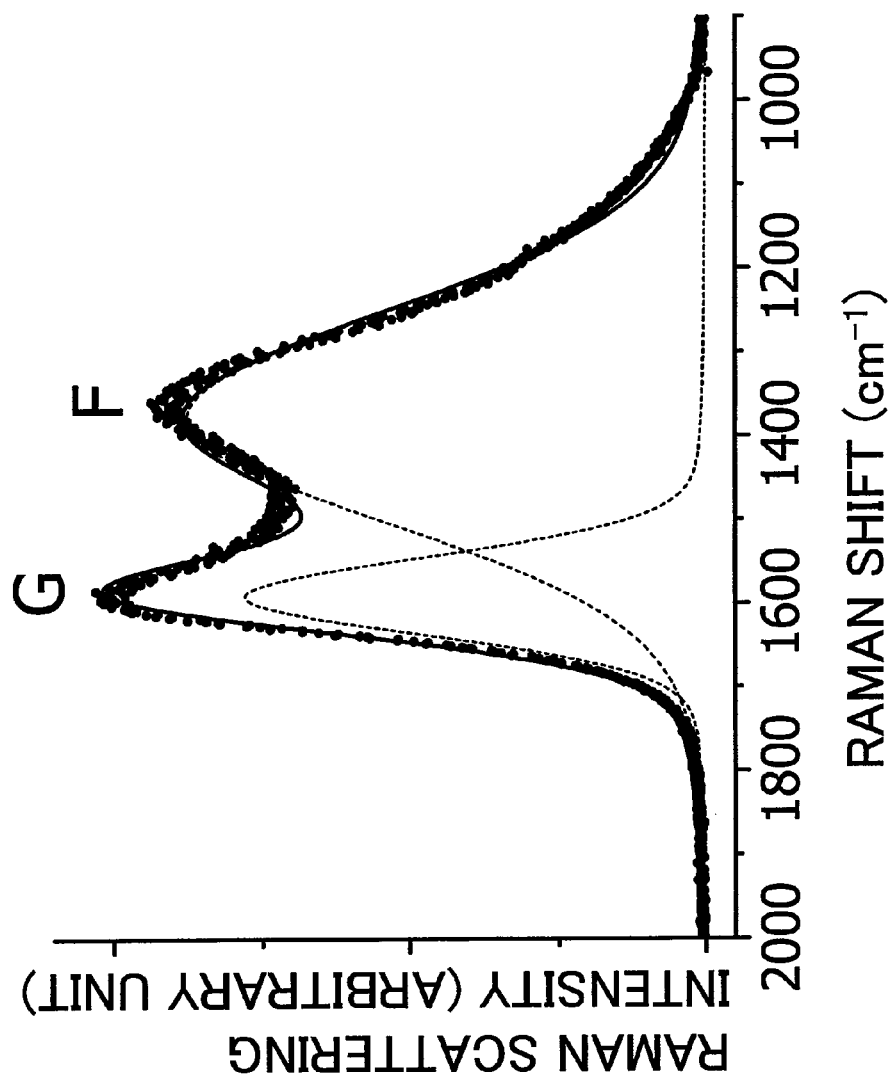
FIG. 7 is a view illustrating Raman spectrum on carbon nanoparticles according to Reference Example.

FIG. 7 shows the result obtained by measuring, with Raman spectroscopy analysis, the ratio of graphite of the carbon nanoparticles 5 which are the constitutive element of the surface nanostructure 3. Analysis was performed under the air atmosphere, and wavelength of the excitation light was 488 nm. Intensity area ratio F/G of Peak F at 1,375 $cm^{-1}$ and Peak G at 1,595 $cm^{-1}$ was 3.0.

Example 1

Production of Oxygen Electrode

Oxygen electrode was produced by bonding acetylene black of the carbon particles 1 with the carbon thin-film produced by heat-treating macromolecule as the carbon thin-film 2 and forming on their surface the surface nanostructure 3 as shown in Reference Example.

Then, 4.0 g of acetylene black (DENKI KAGAKU KOGYO KABUSHIKI KAIHSA) with a diameter of about 50 nm, 2.0 g of polyacrylonitrile (Sigma-Aldrich Corporation) and 54.6 g of dimethylacetamide (Wako Pure Chemical Industries, Ltd.) were mixed and the mixture was agitated for 20 hours with a ball mill. 1.69 g of this mixture was dropped on 19.6 $cm^2$ of carbon paper (Toray), and the solvent was evaporated in the low-vacuum chamber. Then the carbon paper was heated with the low-vacuum dryer. Temperature was elevated from the room temperature to 120° C. in 40 minutes and the elevated temperature was kept for 2 hours. Finally, this carbon paper was transferred to an infrared imaging furnace under the argon atmosphere and was heated for 30 minutes at arrival temperature of 800° C. which was elevated in the range of 1-20° C. per second. As a result of foregoing procedures, the carbon paper comprising a layer formed by the acetylene black bound with the carbon thin-film was produced.

Then, 1.26 g of the catalyst precursor solution noted in Reference Example was dropped on the carbon paper prepared previously, and the solvent was evaporated in the low-vacuum chamber. Then the carbon paper was heated with the low-vacuum dryer. Temperature was elevated from the room temperature to 200° C. in 40 minutes and the elevated temperature was kept for 2 hours. Finally, heating was conducted in an infrared imaging furnace under the argon atmosphere for 30 minutes at arrival temperature of 800° C. which was elevated at 10° C. per second.

As a result of foregoing procedures, the oxygen electrode (the catalytic electrode) with the surface nanostructure is produced.

Comparative Example 1

Production of Comparative Electrode

For a comparative example on stability of the platinum nanoparticles with a diameter of about 2 nm, a conventional oxygen electrode (a catalytic electrode) used in fuel cell was prepared as a comparative electrode. Main elements of the comparative electrode are the carbon paper and acetylene black with a diameter of about 50 nm. Platinum nanoparticles were produced with reduction-precipitation method and were physically adsorbed onto the acetylene black. Average diameter of the platinum nanoparticles was 2.3 nm and was comparable to those referred to in Reference Example. Relation between average diameter of the acetylene black and that of the platinum nanoparticles according to Comparative Example 1 is shown as the denotation 12 in FIG. 6. Average diameter of the acetylene black is larger than the upper limit of the appropriate diameter to realize the surface nanostructure 3.

[Evaluation of Oxygen Electrode]

Figure 8:
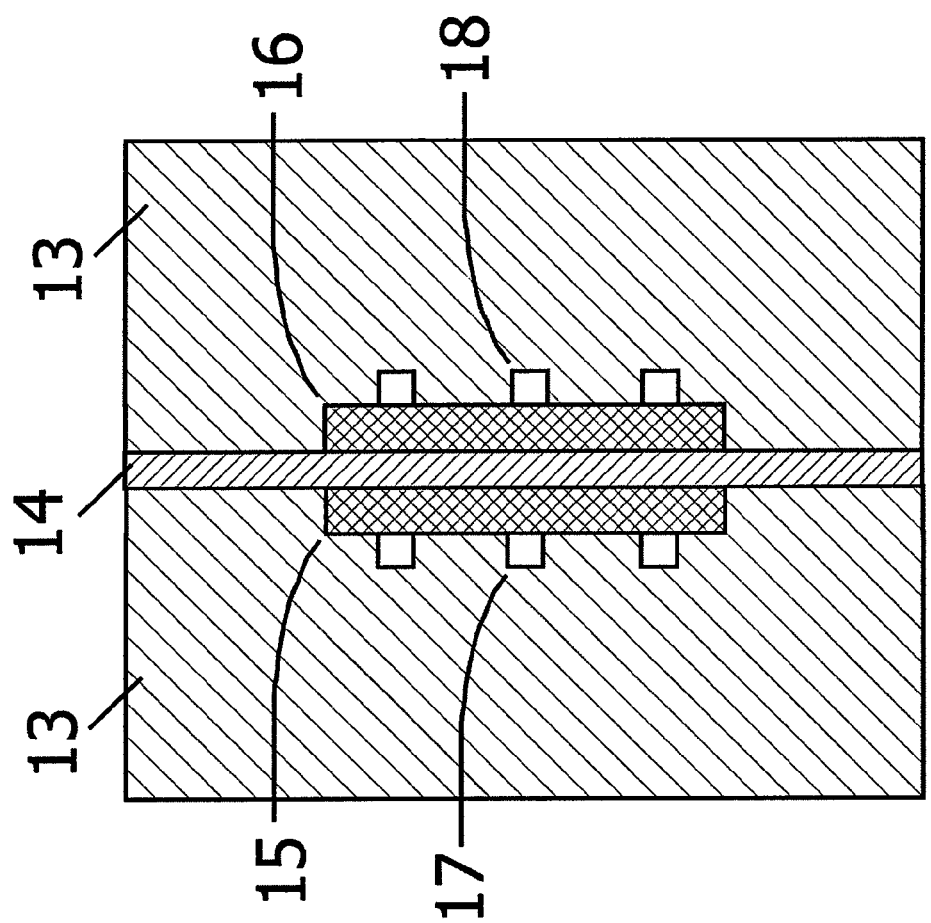
FIG. 8 is a cross-sectional view illustrating cell for the fuel cells according to Example 1 and Comparative Example 1.

A fuel cell installed the oxygen electrodes and evaluation experiments of the oxygen electrodes are described. FIG. 8 is the cross-sectional view showing the structure of the cell. Constitutive elements of the cell are the oxygen electrode 15, the hydrogen electrode 16, the solid polyelectrolyte membrane (Nafion, DuPont) 14, the separator 13 which sandwich these elements, the gas passage 17 for the oxygen electrode, and the gas passage 18 for the hydrogen electrode. As the oxygen electrode 15, the oxygen electrode and the comparative electrode respectively noted in Example 1 and Comparative Example 1 were used. 10 mg/cm² of Nafion disperse solution (Sigma-Aldrich Corporation) was dropped onto surface of the oxygen electrode 15 and was incorporated into the cell. Hydrogen electrode 16 was produced by using platinum-ruthenium as a material for the catalyst nanoparticle and dropping those prepared along with ink method onto carbon paper.

Figure 9:
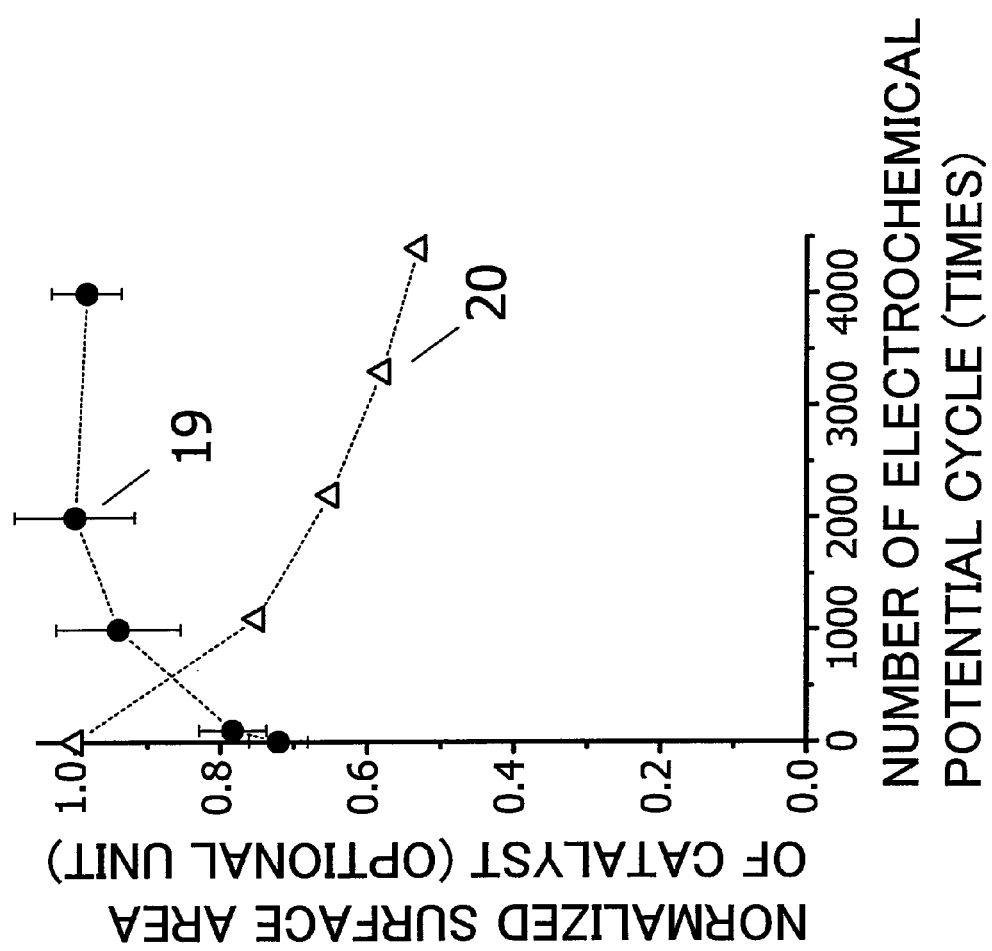
FIG. 9 is a graph illustrating the experiment results on stability of platinum nanoparticles contained in the oxygen electrode according to Example 1 and Comparative Example 1.

FIG. 9 shows the result of the experiment on stability of the platinum nanoparticles contained in the oxygen electrode 15. Nitrogen and hydrogen were introduced respectively into the gas passage 17 for the oxygen electrode and the gas passage 18 for the hydrogen electrode at the flow rate of 50 ml/minutes. Aggregation and deterioration of the platinum nanoparticles were accelerated by repeatedly sweeping electrical potential of the oxygen electrode 15 to the hydrogen electrode 16 in the range of from 0.1 V to 1.0 V. Number of this electrical potential cycle was represented as the horizontal axis in FIG. 9. Vertical axis represented the normalized surface area of the platinum nanoparticles in the oxygen electrode 15. Surface area was determined with the hydrogen adsorption desorption peak in cyclic voltammetry, and it was corresponding to the area of electrochemically active surface. Change on this surface area is very preferable index on the aggregation of the platinum nanoparticles. When such electrical potential cycle was performed 4,000 times, about half of the surface area 20 in the comparative electrode was deactivated, but the surface area 19 in the oxygen electrode was substantially kept. It is apparent that, due to the surface nanostructure which constitutes the outermost surface of the oxygen electrode according to Example 1, the catalytic activity and the stability of the platinum nanoparticles were maintained.

It is obvious for one skilled in the art from the foregoing disclosure that numerous modification of the present invention and the other embodiments of the present invention. Accordingly, the foregoing disclosure should be regarded as an illustration only and is presented in order to teach one skilled in the art as to how to realize the best mode of the present invention. Details of the structure and/or function of the present invention can substantially be changed without departing from the spirit thereof.

The fuel cell according to the present invention comprises the oxygen electrode comprising the surface nanostructure which allows both the catalytic function and immobilization of the catalyst nanoparticles with a diameter of about 1-3 nm, and offers improved stability on such catalytic function.

What is claimed is:

1. A fuel cell comprising an oxygen electrode, a hydrogen electrode, and solid polyelectrolyte, wherein:
    the solid polyelectrolyte is sandwiched between the oxygen electrode and the hydrogen electrode,
    the oxygen electrode comprises carbon particles, a carbon thin-film, and surface nanostructure,
    the carbon particles are bonded to one another with the carbon thin-film,
    the surface nanostructure is formed on the surface of the carbon thin-film,
    the surface nanostructure comprises catalyst nanoparticles and carbon nanoparticles,
    each of the carbon nanoparticles has a shape of a sphere,
    each of the carbon particles has a diameter of not less than 30 nm and not more than 100 nm,
    each of the catalyst nanoparticles has a diameter of a nanometers, which falls within a range of not less than 1.7 nm and not more than 3.1 nm,
    each of the carbon nanoparticles has a diameter of b nanometers, which falls within a range of not less than 1.0 nm and not more than 11.2 nm,
    an equation $$1 \le b \le \frac{\sqrt{3}}{2-\sqrt{3}} a$$

is satisfied such that the carbon nanoparticles form a three-dimensional structure where the catalyst nanoparticles are confined at vacancies and recess of the three-dimensional structure.

2. The fuel cell of claim 1, wherein the oxygen electrode includes a plurality of covered carbon particles each of which comprises the carbon particles covered by the carbon thin film and further covered by the surface nanostructure.

* * * * *